United States Patent
Radosz et al.

(10) Patent No.: US 8,845,988 B2
(45) Date of Patent: Sep. 30, 2014

(54) CARBON-RICH SORBENT FILTERS

(75) Inventors: Maciej Radosz, Laramie, WY (US); Youqing Shen, Laramie, WY (US)

(73) Assignee: Wyoming Research Products Center, Laramie, WY (US)

( * ) Notice: Subject to any disclaimer, the term of this patent is extended or adjusted under 35 U.S.C. 154(b) by 515 days.

(21) Appl. No.: 12/601,374

(22) PCT Filed: May 12, 2008

(86) PCT No.: PCT/US2008/063377
§ 371 (c)(1),
(2), (4) Date: May 19, 2010

(87) PCT Pub. No.: WO2008/147676
PCT Pub. Date: Dec. 4, 2008

(65) Prior Publication Data
US 2010/0242728 A1    Sep. 30, 2010

Related U.S. Application Data

(60) Provisional application No. 60/931,340, filed on May 23, 2007.

(51) Int. Cl.
*B01D 53/04* (2006.01)
*B01D 53/047* (2006.01)
*B01D 53/62* (2006.01)
*B01D 53/82* (2006.01)
*B01D 53/96* (2006.01)
*B01D 53/12* (2006.01)

(52) U.S. Cl.
CPC ...... *B01D 53/04* (2013.01); *B01D 2259/40088* (2013.01); *B01D 2257/504* (2013.01); *Y02C 10/08* (2013.01); *B01D 53/12* (2013.01); *B01D 2253/102* (2013.01)
USPC ............................................ 423/230; 423/220

(58) Field of Classification Search
USPC ............ 423/220, 230; 502/400, 401, 416, 417
See application file for complete search history.

(56) References Cited

U.S. PATENT DOCUMENTS

5,089,034 A * 2/1992 Markovs et al. ................... 95/99
5,304,234 A * 4/1994 Takatsuka et al. ............... 95/106
(Continued)

FOREIGN PATENT DOCUMENTS

WO    WO2007/039168    * 4/2007 ............ C04B 28/02

OTHER PUBLICATIONS

Attari et al., "Sampling and Analysis of Natural Gas Trace Constituents." Institute of Gas Technology, published Sep. 1, 1993.*

(Continued)

*Primary Examiner* — Stanley Silverman
*Assistant Examiner* — Daniel Berns
(74) *Attorney, Agent, or Firm* — Davis, Brown, Koehn, Shors & Roberts, P.C.; Kent A. Herink

(57) ABSTRACT

A low-pressure multifunctional filter separates $CO_2$ and other air pollutants from flue, coal, natural and other gas mixtures. The separation agent is a solid carbon-rich sorbent, such as coke, charcoal, coal or activated carbon, that captures $CO_2$ and other air pollutants at lower temperatures and liberates them at higher temperatures. The sorbent is regenerated by heating with direct steam, hot $CO_2$ or other source of thermal energy. The recovered $CO_2$-rich product can be used for enhanced oil recovery, enhanced methane recovery, and subsequent storage in depleted oil and gas reservoirs.

13 Claims, 9 Drawing Sheets

(56) References Cited

U.S. PATENT DOCUMENTS

| | | |
|---|---|---|
| 7,060,233 B1 | 6/2006 | Srinivas et al. |
| 7,594,956 B2 | 9/2009 | Knaebel |
| 7,740,688 B2 * | 6/2010 | Kumar .............................. 95/100 |
| 2005/0132884 A1 * | 6/2005 | Xu et al. ......................... 95/236 |
| 2006/0032788 A1 | 2/2006 | Etter |
| 2006/0120933 A1 * | 6/2006 | Boardman et al. ............. 423/210 |
| 2007/0227732 A1 * | 10/2007 | Miller et al. ................... 166/281 |

OTHER PUBLICATIONS

State of Colorado, "The Formation and Composition of Coal Gas and Natural Gas." (no publication date) Viewed on Jan. 23, 2013 at http://cogcc.state.co.us/library/sanjuanbasin/blm/Background/fcoalnat.htm.*

* cited by examiner

Temperature Swing with Steam

CARBON-RICH SORBENT FILTERS

BACKGROUND OF THE INVENTION

The invention relates generally to separating carbon dioxide ($CO_2$), nitrogen oxides ($NO_x$), sulfur oxides ($SO_x$), mercury and other air pollutants from flue gas, coal gas, and other gas mixtures, using a multifunctional filter filled with a carbon-rich sorbent.

Flue gas is a byproduct of fossil-fuel combustion, for example coal combustion in power plants. Flue gas contains mostly nitrogen but also some CO, unreacted oxygen, water vapor, about 10-15% of $CO_2$, and parts-per-million levels of $NO_x$, $SO_x$ and other pollutants, such as mercury and arsenic compounds. Other large-volume gas mixtures, such as coal gasification streams, can also contain $CO_2$ that needs to be recovered. The incentives to recover $CO_2$ are two-fold: to produce and utilize $CO_2$, and to capture and store the unused portion of it that otherwise pollutes the environment.

$CO_2$ can be recovered from flue gas using conventional liquid absorption, membrane separation and solid adsorption. The benchmark commercial approach is the aqueous amine absorption that produces $CO_2$ for about $40-50/ton. The other known approaches can be even more expensive. For example, membrane separations usually involve high compression costs. Solid pressure-swing adsorption, on the other hand, requires expensive and often moisture sensitive materials, such as zeolites (R. V. Siriwardane et al. *Energy Fuels* 15, 279-284, 2001), high compression costs, and expensive sorbent recovery. This includes alkali-metal-based and amine-based sorbents, virgin or deposited on porous materials, which capture $CO_2$ via carbonate-forming chemical reactions (for example, S. C. Lee et al. *Catalysis Today*, 111, 385-390, 2006; N. Shigemoto et al. *Energy Fuels*, 20, 721-726, 2006; A. Arenillas et al. *Fuel*, 84, 2204-2210, 2005).

On the basis of prior research related to displacing coal-bed methane with $CO_2$, we know that virgin coal has a higher capacity for $CO_2$ than it does for methane (for example, A. Nodzenski, *Fuel* 77, 1243-1246, 1998). This has been demonstrated at elevated pressures relevant to enhanced coal-bed-methane recovery. It is also known that activated carbon can have even higher $CO_2$ capacity. Again, this has been established at elevated pressures relevant to pressure-swing adsorption (PSA) (Na et al. *Ind. Eng. Chem. Res.* 41, 5498-5503, 2002; R. V. Siriwardane et al. *Energy Fuels* 15, 279-284, 2001). Separately, carbon-rich materials tend to exhibit low $CO_2$ sorption heats but are known to absorb microwave energy, for example to heat up a spent sorbent to desorb or react the sorbed material (Yuan et al. Proceedings of Air & Waste Management Association 94th Annual Conference, Orlando, 2001; Kong and Cha, *Energy Fuels*, 10, 1245-1249, 1996; 9, 971-975, 1995). There are also numerous references to conventional adsorption on solids and absorption in liquids aimed at separating gas mixtures. A sample of relevant references is given below.

U.S. Pat. No. 7,153,344 concerns a method of removing $CO_2$ from the gas produced by oxidative combustion of carbon-containing fuels using a "semipermeable material", such as a hollow-fiber membrane or molecular sieve adsorbent, which allows for passage of nitrogen, but retains oxygen containing components, mainly $CO_2$, $H_2O$ and $O_2$. By contrast, the process disclosed in this invention does not utilize membranes or $H_2O$— or $O_2$-retaining molecular sieves. Instead, this invention utilizes multifunctional carbon-rich sorbents that, while $CO_2$ specific, largely allow for passage of $H_2O$ and $O_2$.

US Patent Application 2006/0162556 A1 and PCT Application WO 03/053546 teach an adsorptive separation method and apparatus to purify air (not flue gas) prior to its cryogenic separation, by removing primarily nitrous oxide ($N_2O$) but also possibly other air impurities, such as hydrocarbons, $CO_2$ and water, on a moisture-retaining zeolite-type adsorbent or activated carbon. By contrast, the process disclosed in this invention deals with removal of $CO_2$, not from air, and does not utilize materials that retain moisture.

PCT Application WO 2005/108297 A2 teaches a method to capture excess $CO_2$ from ambient air (not from flue gas) using a variety of methods primarily based on a chemical reaction of $CO_2$ with common minerals to produce solid carbonate materials.

U.S. Pat. No. 6,562,103 B2 teaches a pressure-swing adsorption (PSA) process for direct reduction of iron where $CO_2$ is removed from the spent reducing gas.

European Patent EP 0 768 117 B1 teaches a method how to prepare a carbonaceous material and how to modify it by halogenation and hydrocarbon treatment to make it a suitable pressure-swing adsorbent for separating air into oxygen and nitrogen.

European Patent EP 0 636 672 B1, U.S. Pat. No. 5,522,228, and WO 95/04115 disclose a refrigeration process by adsorption and desorption of pure $CO_2$ on solid surfaces of activated carbon fibers or an active charcoal at elevated pressures.

U.S. Pat. No. 5,439,054 teaches an in-situ method of separating gaseous fluids, for example mixtures containing methane and $CO_2$, within a carbonaceous subterranean material, such as a coal seam.

U.S. Pat. No. 4,770,676 discloses a pressure-swing adsorption (PSA) and temperature-swing adsorption (TSA) process to recover methane from land fill gas.

U.S. Pat. No. 4,624,839 discloses a liquid absorption of $CO_2$ in an aqueous amine solution improved with a copper inhibitor additive.

The objective of this invention is to use an inexpensive and relatively moisture-insensitive sorbent that can work at low pressures, without the need for feed compression, has relatively low heat of adsorption for an efficient thermal recovery, and, ideally, captures primarily $CO_2$, residual $NO_x$, $SO_x$ (if needed), and mercury, but does not retain much nitrogen, oxygen, and water. Carbon-rich sorbents, for example carbonaceous sorbents derived from coal and other carbon-containing materials, meet this requirement.

SUMMARY OF THE INVENTION

The subject of this invention is a multifunctional filter filled with a carbon-rich sorbent that retains $CO_2$ at near ambient temperatures and pressures and releases it at elevated temperatures, say at or above about 100° C. The sorbent made of charcoal, coke, activated carbon, coal, or other form of carbon-rich material can be heated with steam, hot $CO_2$, or other forms of thermal energy. Such a multifunctional filter process can be attached to an existing or grassroots power plant, for example, through heat integration with hot flue gas, ash, and steam. While nitrogen and other benign components flow through the sorbent without much retention, other air pollutants, such as $NO_x$, $SO_x$, and mercury, are also preferentially retained. The $CO_2$ recovered from flue gas can be used, for example, for enhanced oil recovery (EOR), enhanced coal-bed methane recovery (ECBMR), and ultimately for storage in spent oil, gas and other reservoirs.

BRIEF DESCRIPTION OF THE FIGURES AND TABLES

FIGS. 1*a*-1*d* are charts of experimentally determined equilibrium $CO_2$ sorption capacity as a function of pressure at temperatures from 25° C. to 130° C. for four examples of carbon-rich sorbents—activated carbon AC1 and AC2 (FIGS. 1a and 1d), coke (FIG. 1b), and coal (FIG. 1c), which shows that the sorption capacity can vary substantially from sorbent to sorbent and it increases with increasing pressure but decreases with increasing temperature ((♦) 25° C., (■) 75° C., (▲) 110° C., and (■) 130° C.).

DESCRIPTION OF THE INVENTION

Figure 3:
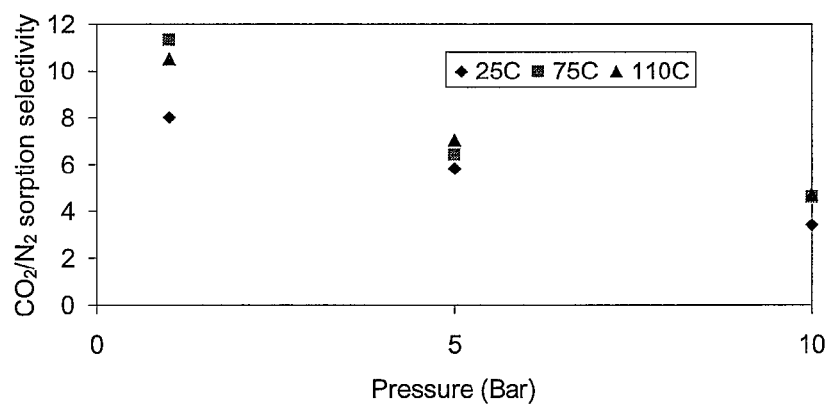
FIG. 3 is a chart of experimentally determined $CO_2$/nitrogen selectivity as a function of pressure at three different temperatures, which shows that this selectivity decreases with increasing pressure, which, in turn, suggest that a low-pressure sorption can result in the most selective $CO_2$ capture.
Figure 4:
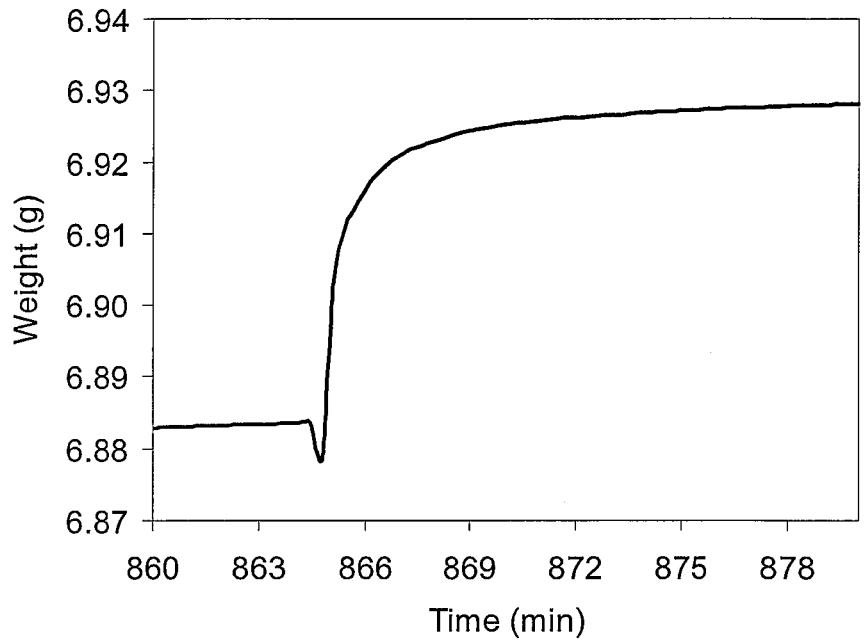
FIG. 4 is a chart of experimentally determined $CO_2$ sorption at low-pressure and 25° C. as a function of time for sorbent labeled "2" in FIG. 1, which shows that the equilibrium sorption is achieved within a few minutes, and hence the sorption rate is high enough for a practical process.

Specific design choices and economics for the process described in this invention will depend on the $CO_2$ sorption capacity, selectivity, and rate, of which examples are shown in FIGS. 1, 3, and 4. These properties can vary and can be modified by chemical and thermal treatment, but activated carbon can have a capacity of about 7-10 wt %, coal coke or charcoal can have a capacity of about 5-7 wt %, and virgin coal up to about 2 wt %.

While these sorption capacities will depend on the specific material, and its history, they are much higher that those for nitrogen, which are very low or essentially zero. This suggests an excellent selectivity relative to nitrogen. While zeolite sorbents can have somewhat higher $CO_2$ capacity, they cost much more, are moisture sensitive, and exhibit high heat of sorption.

Figure 5:
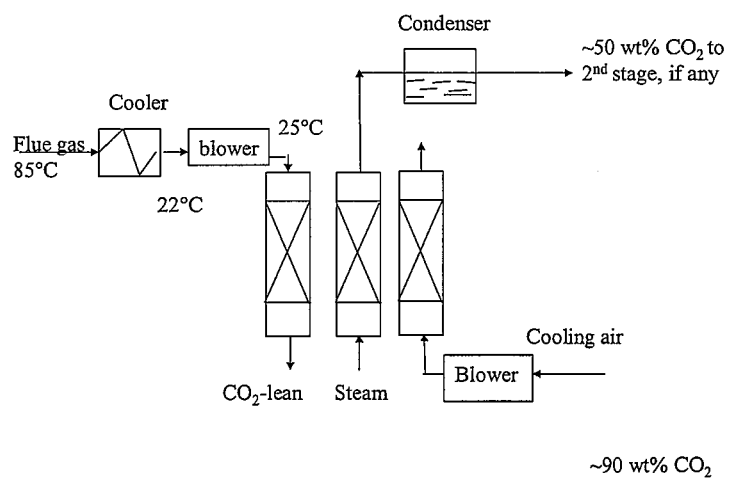
FIG. 5 is an example of a process flow chart with a thermal ("temperature swing") recovery using direct heating with steam.
Figure 6:
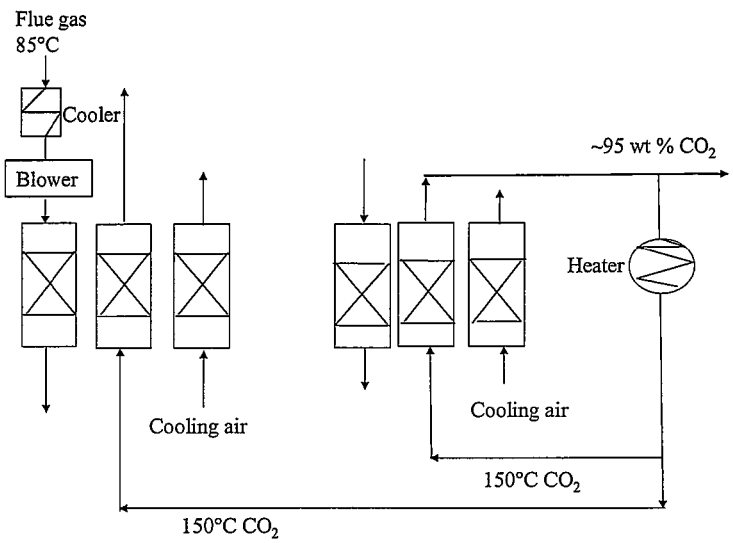
FIG. 6 is an example of a process flow chart with a thermal ("temperature swing") recovery using direct heating with hot $CO_2$.

Examples of a process embodiment are shown in FIGS. 5 and 6. In brief, the flue gas is cooled, typically to a temperature that is around and not too much higher than ambient temperature, and fed with a blower through a sorption vessel which may include fixed beds and fluidized beds. Depending on the sorbent characteristics and purity target, the effluent from this vessel may or may not flow through a second stage sorption vessel. When the sorbent is saturated with $CO_2$, the flue-gas flow is directed to a secondary vessel filled with freshly regenerated sorbent, while the primary sorbent is regenerated by direct heating with steam or hot $CO_2$ and then cooled with air or other cooling medium. The primary and secondary vessels alternate in their sorption-desorption cycles, which enables a continuous flow operation. A preferred sorption temperature is below or somewhat higher than the ambient temperature. A preferred desorption temperature is around 100-150° C. to a few hundred ° C, but it can be somewhat lower or much higher.

Figure 7:
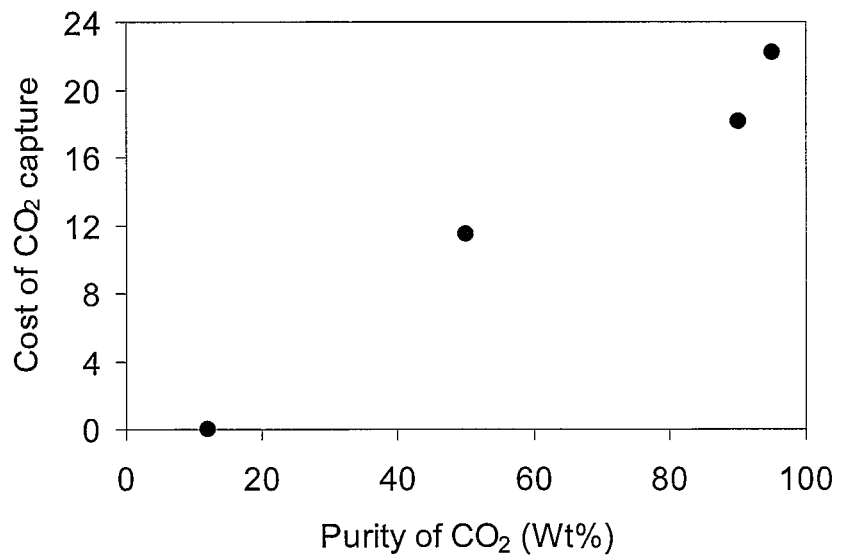
FIG. 7 is a chart of an approximate $CO_2$ capture cost in 2007 dollars per ton of $CO_2$ as a function of $CO_2$ purity (wt % in nitrogen) for an example quoted in Table 1, using direct steam recovery.

A typical $CO_2$ recovery is about 90%, but it can vary from about 50% to close to 100%. A typical $CO_2$ purity range is 80-95%, but it can vary as low as economically justifiable to close to 100%. Normally, the cost of recovered $CO_2$ will increase with increasing purity, for example, by a factor of two or so on going from about 50% purity to about 95% purity, as shown in FIG. 7 for a simplified cost example estimated for the case presented in Table 1.

TABLE 1

| Example of power plant flue gas | |
| --- | --- |
| Capacity: | 335 MW |
| Flue gas flow rate: | 610 m³/s (STP) |
| Flue gas temperature through stack: | 85° C. |
| Gas composition: | weight percent/ppm |
| $N_2$ | 67% |
| $CO_2$ | 11.8% (3,519 kt/year) |
| $O_2$ | 12% |
| $H_2O$ | 8% |
| CO | 300 ppm |
| $SO_2$ | 180 ppm |
| NOx | 150 ppm |

Wyoming, a U.S. state with population of approximately 0.5 million, is blessed with rich deposits of good-quality coal that is commonly used to produce inexpensive electricity. A small-to-average-sized Wyoming power plant was targeted as an example to illustrate the carbon capture opportunities of the present invention. However, the analysis and conclusions presented here are universally applicable to—and, in fact, explored for—any combustion-based power plant. A target plant should be located close to large oil-producing fields that can use $CO_2$ to displace more oil from their mature reservoirs. Also, for an easy reference and comparison, such a plant should produce about as much $CO_2$ as the very large natural-gas plant owned and operated by ExxonMobil in LaBarge, Wyo., which currently supplies the local EOR operators with $CO_2$. Data for a Gillette power plant called Wyodak that meets these criteria are shown in Table 2, along with data for other Wyoming power plants and their $CO_2$ production.

TABLE 2

| Wyoming Coal-Fired Power Plants | | | |
| --- | --- | --- | --- |
| Plant | Town | Capacity (MW) | $CO_2$ Production in 2002 (tons) |
| Jim Bridger | Rock Springs | 2120 | 18,576,558 |
| Laramie River | Wheatland | 1650 | 14,442,863 |
| Dave Johnson | Glenrock | 762 | 7,362,207 |
| Naughton | Kemmerer | 700 | 6,012,586 |
| Wyodak | Gillette | 335 | 3,519,336 |

TABLE 2-continued

Wyoming Coal-Fired Power Plants

| Plant | Town | Capacity (MW) | $CO_2$ Production in 2002 (tons) |
|---|---|---|---|
| Neil Simpson II | Gillette | 114 | 1,264,726 |
| Wygen I | Gillette | 90 | ~900,000 |
| Total | | 5771 | 52,078,276 |

The total $CO_2$ production from these power plants alone is approximately 52 million tons of $CO_2$ per year, which corresponds to slightly more than 100 tons (approximately 225,000 lbs) per capita. The Wyodak flue gas is characterized in Table 3.

TABLE 3

Wyodak Flue-Gas Volumetric Comparison

| Parameter | Value |
|---|---|
| Flow rate | 488 m³/s (STP) |
| Temperature at stack | 85° C. |
| Composition | |
| $N_2$ | 67% |
| $CO_2$ | 11.8% |
| $O_2$ | 12% |
| $H_2O$ | 8% |
| CO | 300 ppm |
| $SO_2$ | 180 ppm |
| $NO_x$ | 150 ppm |

Figure 1A:
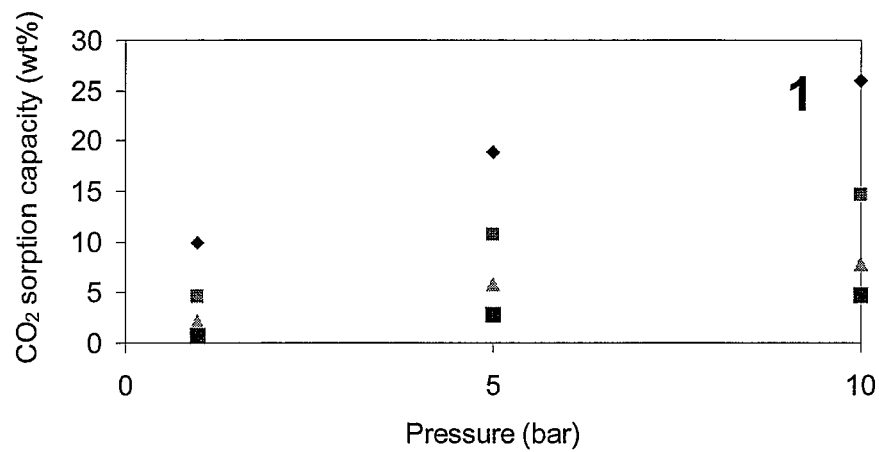
Figure 1B:
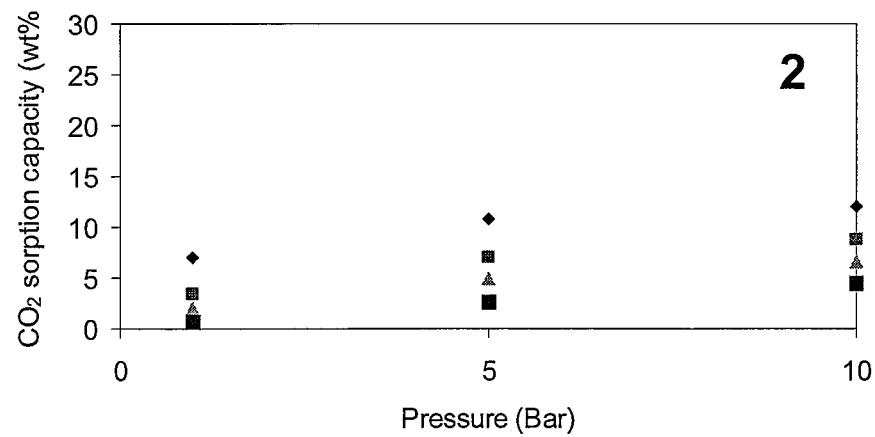
Figure 1C:
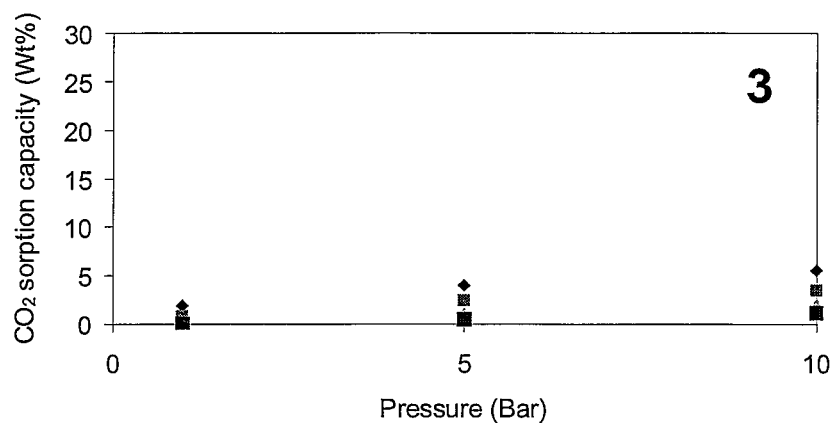
Figure 1D:
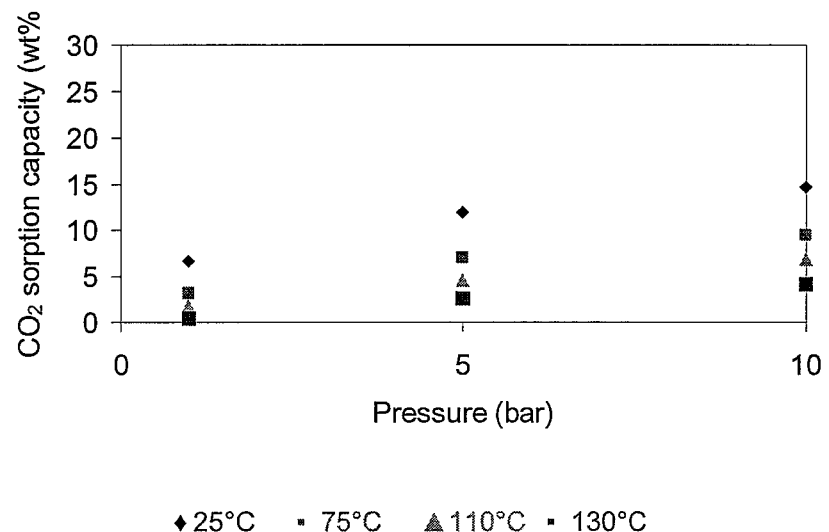
Figure 2:
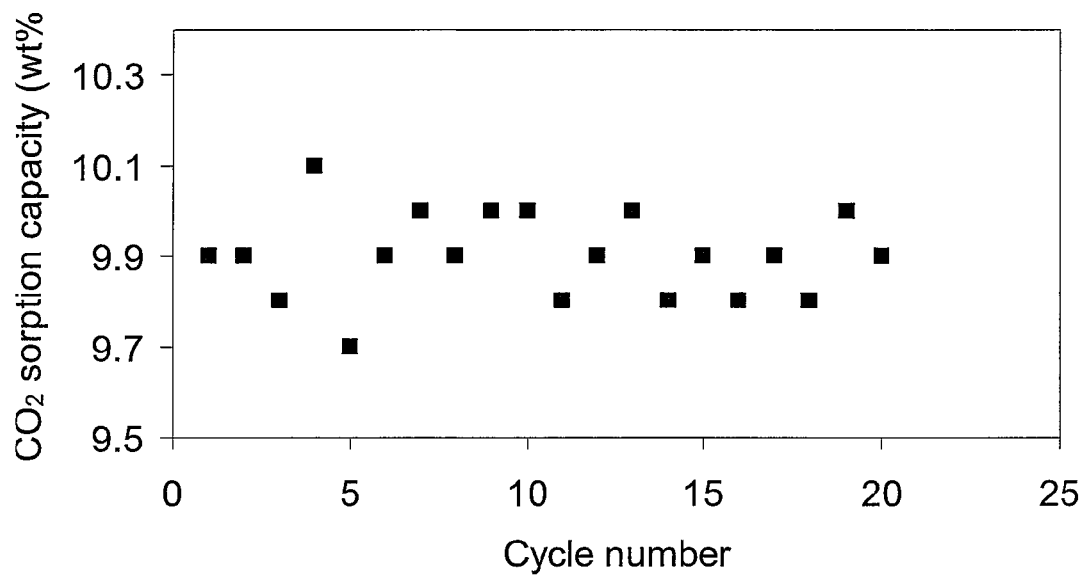
FIG. 2 is a chart of experimentally determined equilibrium $CO_2$ sorption capacity for sorbent labeled "2" in FIG. 1 as a function of temperature cycle number, which shows that temperature cycling does not alter the sorption capacity much.

Amine Absorption: A Reference for Technical and Economic Approximations. The amine absorption process shown in FIG. 2 is known to be effective for separating $CO_2$ from mixtures of natural gas and flue gas and, hence, it is used in this work as a point of reference for alternative $CO_2$ separation processes. In this benchmark process, the feed is the Wyodak flue-gas mixture characterized in Table 2 and the solvent is a weakly basic aqueous monoethanolamine (MEA) solution. While the $CO_2$— containing flue gas counter-currently contacts the MEA solution in an absorber vessel at approximately 40-60° C., $CO_2$ weakly bonds to the MEA amine, while the other gas components flow through the solution without retention, which is the basis for the $CO_2$ selectivity. The $CO_2$-rich bottoms stream is heated to 100-140° C. to break the $CO_2$-amine bond and release $CO_2$ in a stripper column. The $CO_2$-lean bottoms stream from the stripper column is cooled before it is recycled to the absorber. The goal of this separation is a minimum of 90% of the $CO_2$ in the overhead stream from the stripper column and a minimum of 90% recovery (no more than 10% of $CO_2$ originally present in the flue gas is vented with the absorber overhead stream). First-pass technical and economic approximations for this and all other process examples cited herein are consistent with those reported in subsequent sections. No attempt has been made to optimize the process with the most-accurate data but rather to develop approximate but self-consistent cases that can be compared to the benchmark amine process. For such preliminary approximations, the cost of recovered $CO_2$ using the MEA process shown in FIG. 2 is approximately $47/ton, before compression, which is slightly higher than, but in realistic agreement with, the commonly quoted data ($40-$50/ton of compressed $CO_2$) for an optimized MEA process. As usual, the cost of steam to heat the solvent is the most significant operating cost. Despite the amine volatility losses and its corrosiveness, this is a convenient benchmark for comparing alternative processes, because it is well-established and it continues to be a subject of extensive research.

Ionic Liquid Absorption is Slow. One of the early leads in this work was $CO_2$ absorption in ionic liquids, which are known to be selective for $CO_2$. However, the $CO_2$ sorption and desorption rates were observed to be very low in the ionic liquids studied in this work (Tang, J.; Sun, W.; Tang, H.; Radosz, M.; Shen, Y. Enhanced $CO_2$ absorption of poly(ionic liquid)s. *Macromolecules* 2005, 38, 2037). Therefore, the ionic liquid absorption option has been abandoned. Instead, polymerized ionic liquids have been determined to be more attractive as solid materials for $CO_2$ membranes and sorbents.

Figure 9:
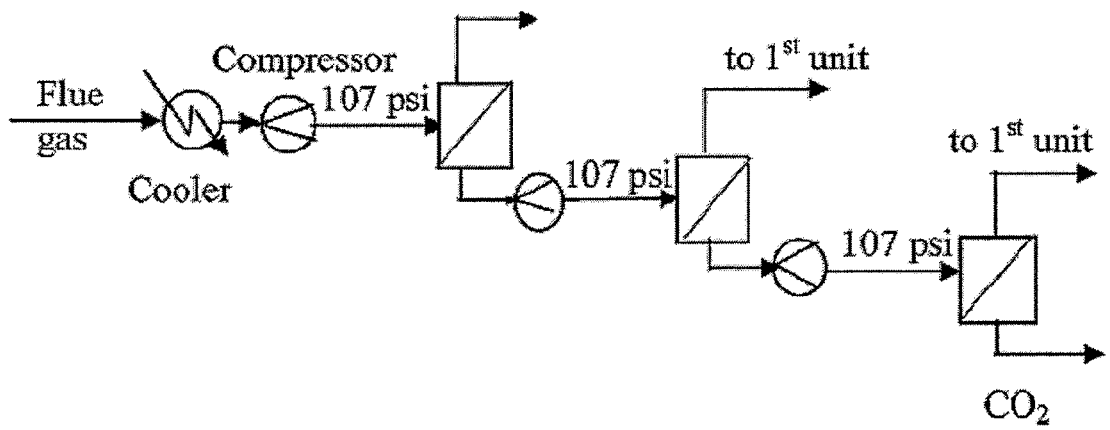
FIG. 9 is a schematic diagram of a brominated poly(phenylene oxide) (BPPO)-silica nanocomposite membrane.

Pressure-Induced Transport is Expensive for Membranes. An example of a $CO_2$-philic membrane-based alternative is shown in FIG. 9, where the $CO_2$ driving force is due to a pressure difference between the permeate (ambient) and retentate (107 psi). From among the many membrane materials that are known to be selective for $CO_2$, relative to nitrogen, a recently synthesized membrane that was made of brominated poly-(phenylene oxide) (BPPO) impregnated with 30 wt % of 10-nm silica, is selected, because its permeability (approximately 800 barrer) and its $CO_2/N_2$ selectivity (approximately 23) place it above the Robeson line. This system can recover at least 90% of the $CO_2$ with a purity of 90%; however, it is costly. There may be more-selective and more-permeable membranes, and perhaps more-efficient $CO_2$-permeation driving forces that minimize the need for compression. However, this simple example highlights and illustrates the basic challenges for any $CO_2$-philic membrane system applicable to a flue gas, which are the need for multiple stages, the cost of compressing a large quantity of $CO_2$-lean feed and permeate streams, and the cost of the membrane material. Because no firm basis for estimating the cost of the BPPO nanocomposite is available at this time, the cost of recovered $CO_2$ is not reported here, except to say that, even for optimistic material cost assumptions, this cost is much higher than that of $CO_2$ from the amine process.

Figure 10:
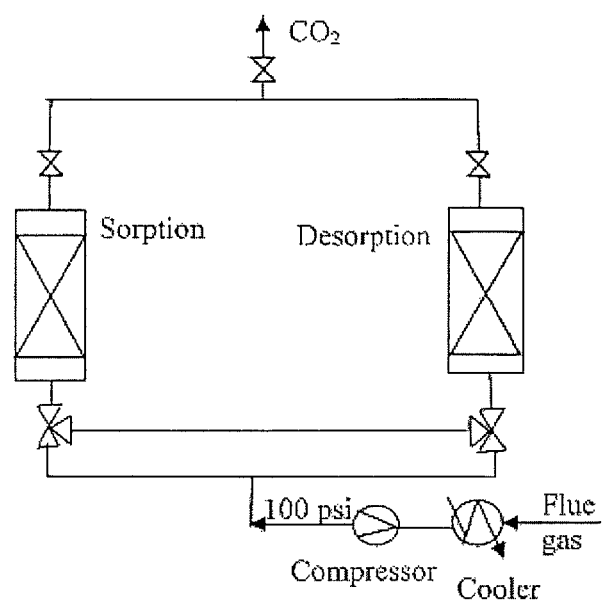
FIG. 10 is a schematic diagram of zeolite 13× pressure swing adsorption (PSA).

Zeolite Sorbents: Heat of Sorption, Moisture Sensitivity, and Material and Pressure Costs. An example of a zeolite-13× PSA process (Siriwardane, R. V.; Shen, M.-S.; Fisher, E. P.; Poston, J. A. Adsorption of CO2 on molecular sieves and activated carbon. *Energy Fuels* 2001, 15, 279) is evaluated in this work for the Wyodak flue gas, again without any attempt to optimize it, except to select preliminary conditions that make the recovery and purity targets technically feasible. A simplified diagram of PSA fixed-bed vessels alternating between the sorption and desorption modes is shown in FIG. 10. In a first pass economic evaluation, the sorption and desorption steps are assumed to be approximately isothermal, even though the $CO_2$ heat of sorption on zeolite is substantial enough to cause the sorption temperature to increase (as much as 50° C.).30 It has been reported that the heat of $CO_2$ adsorption on zeolite is approximately 30 kJ/mol, 56 which is approximately 10 times higher than that on activated carbon (approximately 3 kJ/mol) 35 at the same temperature 25° C. and pressure 1 bar. Another drawback of the zeolite sorbent is its moisture sensitivity, which requires much higher (say, over 300° C.) drying temperatures than the minimum temperatures needed to remove $CO_2$ alone, which means extra recovery costs. However, ignoring these drawbacks in a first-pass economic evaluation leads to a cost of recovered $CO_2$ that is approximately $70/ton, which is less than the membrane-recovered $CO_2$, but is approximately 40% more than the amine benchmark cost. The need to dry the zeolite will increase this cost. The main cost components are the compression cost and the zeolite cost ($33/lb). A less expensive sorbent, such as activated carbon (for example, $1-$2/lb), can reduce the material cost, but compression will still be required, if it is used in a PSA mode. Therefore, a PSA route is not evaluated further in this work.

Carbonaceous Sorbents: $CO_2$-Selective but Moisture Insensitive and Easy to Regenerate. Based on the amine, membrane, and PSA separations previously outlined, although there is room for improvement and plenty of work in progress, a preliminary conclusion is to explore alternative flue-gas carbon-capture approaches that require no upstream compression and utilize a low-cost $CO_2$— selective sorbent that is easy to regenerate. Ideally, such a sorbent should be relatively insensitive to moisture, but selective to other flue-gas pollutants, such as $NO_x$, $SO_x$, mercury, and arsenic, which would allow for a multifunctional sorbent. Some but not all carbon -rich (carbonaceous) materials, such as activated carbon, charcoal, other coal pyrolysis-derived materials, or even virgin coal, can satisfy these requirements (Teng, H.; Suuberg, E. M.; Calo, J. M. Studies on the reduction of nitric oxide by carbon: The NO-carbon gasification reaction. *Energy Fuels* 1992, 6, 398; Lai, C. S.; Peters, W. A.; Longwell, J. P. Reduction of NO by Charcoal over CaO. *Energy Fuels* 1988, 2, 586; Tsuji, K.; Shiraishi, I. Combined desulfurization, denitrification and reduction of air toxics using activated Charcoal. *Fuel* 1997, 76, 549; Tang, Q.; Zhang, Z.; Zhu, W.; Cao, Z. SO2 and NO selective adsorption properties of coal-based activated carbon. *Fuel* 2005, 84, 461; Lee, S. H.; Rhim, Y. J.; Cho, S. P.; Baek, J. I. Carbon-based novel sorbent for removing gas-phase mercury. *Fuel* 2006, 85, 219; (53) Scala, F. Modeling mercury capture in coal-fired power plant flue gas. *Ind. Eng. Chem. Res.* 2004, 43, 2575; Hassett, D. J.; Eylands, K. E. Mercury capture on coal combustion fly ash. *Fuel* 1999, 78, 243; Chuang, C. L.; Fan, M.; Xu, M.; Brown, R. C.; Sung, S.; Saha, B.; Huang, C. P. Adsorption of arsenic (V) by activated carbon prepared from oat hulls. *Chemosphere* 2005, 61, 478).

Four preliminary model carbon-rich materials have been evaluated in this study: activated carbon 1 and 2 (denoted as AC1 and AC2, respectively), coke (denoted as Charcoal), and virgin bituminous coal (denoted as Coal). Their average particle diameter is approximately 2 mm, except for AC1 (which is 1.6 mm), which is acceptable for the laboratory tests, but will have to be adjusted for commercial applications, to minimize the pressure drop due to a blower -induced flow of flue gas. Their surface properties and apparent densities are given in Table 4; materials for specific scale-up applications will have customized properties.

The bulk prices of these materials may vary widely, but, for this study, we conservatively estimate an approximate cost to be approximately $1500/ton for AC1 and AC2, approximately $200/ton for Charcoal, and approximately $40/ton for Coal.

Sorption Capacity, Selectivity, Rate, and Thermal Stability. A Rubotherm magnetic-suspension balance (MSB), rated up to 500 bar and 150° C., is used to measure the $CO_2$ and nitrogen sorption in these carbonaceous sorbents. The MSB consists of a sorption chamber that is used to expose the sample to a gas at elevated temperatures and pressures, and a microbalance, which is isolated from the sample and exists under ambient conditions. An electromagnet connected to the microbalance is adjusted so that a permanent magnet connected to a rod-rod-basket assembly and located within the sorption chamber is kept suspended. Thus, the microbalance measures a weight that is proportional to the electromagnetic force, which keeps the rod-rod-basket assembly in suspension. A detailed description of the MSB procedure used in this work was reported elsewhere (Blasig, A.; Tang, J.; Hu, X.; Shen, Y.; Radosz, M. Magnetic suspension balance study of carbon dioxide solubility in ammonium-based polymerized ionic liquids: polyp-vinylbenzyltrimethyl ammonium tetrafluoroborate) and poly([2-(methacryloyloxy)ethyl]trimethyl ammonium tetrafluoroborate). *Fluid Phase Equilib.* 2007, 256, 75).

In brief, the MSB chamber shown in FIG. 5 is flooded with $CO_2$ from a gas cylinder, which passes through two columns filled with phosphorus peroxide ($P_2O_5$). Its pressure is controlled with a cylinder regulator at low pressures (≤30 bar) or with a syringe pump (Isco, model 260D) at high pressures (>30 bar). After closing the sorption chamber the polymer is degassed by evacuating the sorption chamber at $10^{-2}$ Torr until the weight measured by the microbalance remains unchanged over time. A heating circulator (Julabo, model F26ME) is used to control the temperature of the chamber, which is measured with a calibrated platinum resistance thermometer to an accuracy of ±0.5° C. The mass of the sorbed $CO_2$ is determined from the increase of the electromagnetic force needed to maintain the sample in suspension. Eventually, when the sorbent reaches its sorption capacity, the weight of the sample stops increasing. Both the equilibrium sorption capacity and the sorption as a function of time are recorded.

The equilibrium sorption capacity results are summarized in FIGS. 1a-1d at four constant temperatures, 25, 75, 110, and 130° C., as a function of pressure, up to 10 bar. As expected, the sorption capacity increases as the pressure increases and the temperature decreases. The activated carbon capacity is

TABLE 4

Properties of Carbonaceous Sorbents

| | Value | | | |
|---|---|---|---|---|
| Property | AC1 | AC2 | Charcoal | Coal |
| Surface area | 809 $m^2/g$ | 553 $m^2/g$ | 135 $m^2/g$ | >100 $m^2/g$ |
| Pore volume | 0.45 mL/g | 0.59 mL/g | | |
| Average pore size | 4.21 mm | 7.60 mm | | |
| Surface functional group | Carboxyl, phenolic hydroxyl | Acid washed (chem.. activated) | | |
| Apparent density | 520 $kg/m^3$ | 390 $kg/m^3$ | 450 $kg/m^3$ | 640 $kg/m^3$ |

A Micomeritics Tristar instrument is used to characterize the Brunauer-Emmett-Teller (BET) surface area and the Barrett-Joyner-Halenda (BJH) pore volume and size.

somewhat higher than that of Charcoal, and much higher than that of coal, which correlates with the surface area and the degree and type of activation. For example, the acid-treated AC2 has a lower $CO_2$ sorption capacity than AC1 that has not been chemically modified and, hence, it should be neutral.

Figure 11:
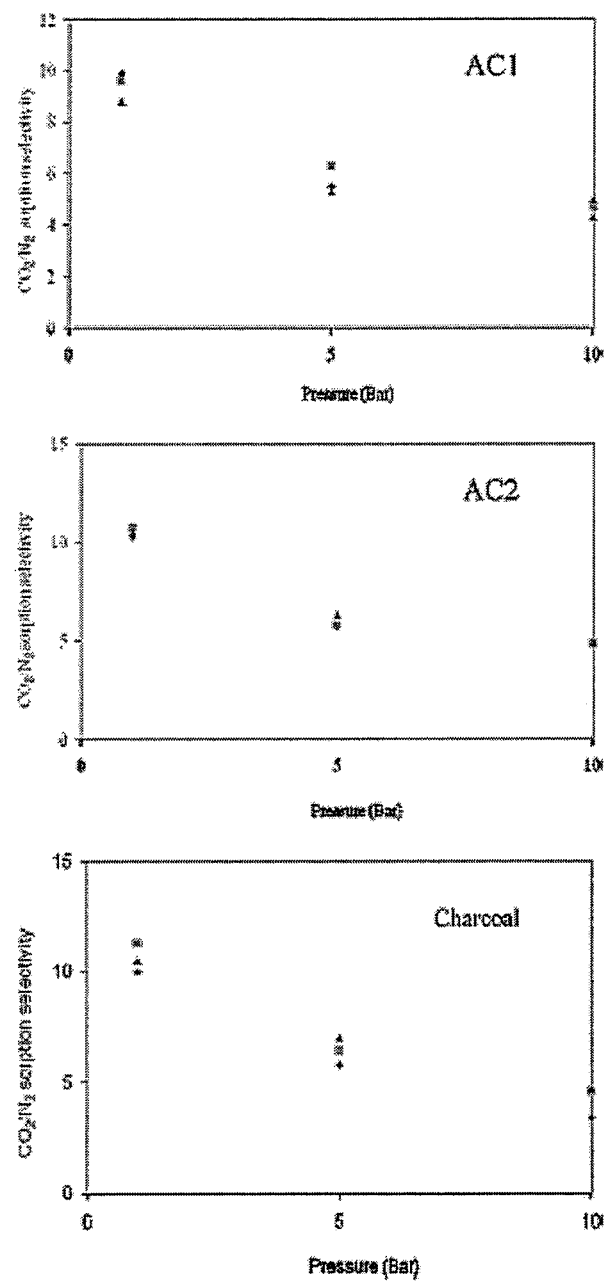
FIG. 11 are three charts of the pressure effect on $CO_2/N_2$ sorption selectivity at (♦) 25° C., (■) 75° C., and (▲) 110° C. for AC1, AC2, and Charcoal.

A more interesting trend emerges based on an ideal $CO_2/N_2$ sorption selectivity (defined here as the ratio of the pure component sorption capacities), shown at 25° C. in FIG. 11: increasing pressure substantially decreases the selectivity (it increases the nitrogen capacity to a far greater extent than it does the $CO_2$ capacity), which points to a low-pressure sorption advantage.

Figure 8:
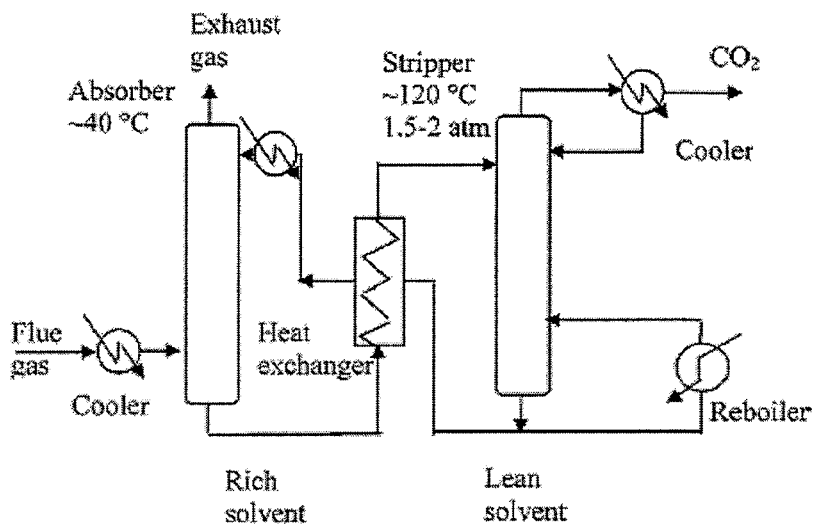
FIG. 8 is a schematic diagram of a monoethanolamine (MEA) absorption benchmark process.
Figure 12:
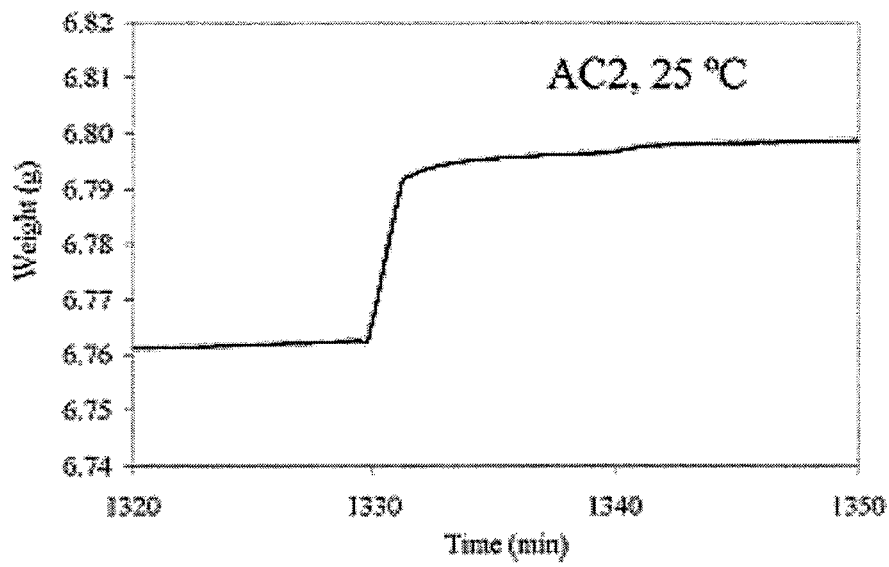
FIG. 12 is a chart of $CO_2$ sorption equilibrium time for AC2 at 1 bar.

All carbonaceous materials studied in this work exhibit a rapid sorption rate. A representative sample for Charcoal and AC2 at 25° C. are shown in FIG. 4 and FIG. 12, respectively. The small negative peak on the right-hand side is an equipment gas-injection artifact. A typical time needed to nearly saturate these materials with $CO_2$, to reach a point where the weight curves shown in FIG. 8 start approaching an asymptote, is approximately 3 min at 25° C. This time increases as the temperature increases to approximately 5-10 min at 75° C. and approximately 10-12 min at 110° C., with Charcoal being on the low side and AC being on the high side. As usual, it takes more time (at least 10 more minutes at lower temperatures) to reach complete saturation (toward the right-hand side of the sample charts in FIGS. 4 and 12). Generally, these results suggest short sorption cycles at low temperatures. One needs to remember that these data are for pure-component sorption, which will need to be verified with multicomponent sorption data. Also, desorption times were not determined accurately in this work; they should be comparable to the sorption times, and they are being evaluated along with multicomponent sorption breakthrough in a scale-up stage of this project.

The $CO_2$ sorption is found to be reproducibly reversible, which suggests a good stability and easy desorption. As shown in FIG. 2, 20 temperature cycles for AC1 between 25° C. and 130° C. do not seem to affect the sorption capacity much (typically within a 0.2 wt % band); charcoal was found to be similar. The equilibration time for AC1 and Charcoal was also measured and was found to stay within a 2-min band upon cycling.

The 12% $CO_2$-in-$N_2$ mixed-gas capacity was determined to be approximately one-fifth of the pure-$CO_2$ capacity (for example, approximately 2.0 wt % for AC1 and approximately 1.3 wt % for Charcoal) and the sorbate $CO_2$ concentration was determined to be approximately 90%. A more-complete account of the mixed-gas capacity and sorbate composition characterization is provided in the work by Krutkramelis et al.

In summary, the sorption capacity data discussed in this section suggest a sorption step near ambient temperature and a desorption step at (below or above) approximately 130° C. The selectivity data suggest a low-pressure sorption step. The preliminary rate data suggest short sorption cycles. To evaluate such a low pressure carbonaceous-sorbent carbon-capture filter (Carbon Filter for short), AC1 and Charcoal sorbents will be used as examples. These will be preliminary examples without an attempt to screen and optimize the sorbent and process conditions.

Carbon Filter Design Assumptions and Approximations. In all process cases in this work, the nominal $CO_2$ recovery target is 90% and its purity target is 90%, but both can be increased or decreased later, when subjected to process optimization. In a first-pass approximation of the flue gas described in Table 3, the Carbon Filter flue-gas feed is assumed to contain 12% $CO_2$, with the balance being nitrogen. At this stage, the other components are neglected, because they exhibit either low sorption capacity (for example, $O_2$ and $H_2O$) or low (ppm-level) concentration (for example $SO_x$, $NO_x$, and mercury), and, hence, do not impact the $CO_2$ sorption significantly. The low $O_2$ sorption capacity has been confirmed in this work for AC1 and has been determined to be as low as that of nitrogen, that is, approximately 1 wt % at 25° C. and 1 bar, which suggests that the $CO_2/$oxygen selectivity should be similar to the $CO_2/$nitrogen selectivity. Unless removed upstream of the Carbon Filter, which may be the case for existing power plants, $SO_x$, $NO_x$, and mercury were reported to have a high affinity for the activated carbon and, hence, are expected to be sorbed with $CO_2$.

The sorption temperature of approximately 25° C. is assumed not to change much during the sorption cycle, because the $CO_2$ heat of sorption is on the low side. The sorption time is set at 2 min, The sorbent regeneration is conservatively set at 150° C., using a direct-steam- or hot-$CO_2$-induced desorption for 2 min, followed by 2 min of cooling with cold air, all on the basis of preliminary breakthrough data taken in our laboratory (Krutkramelis, K.; Hu, X.; Shen Y.; Radosz, M. Equilibrium sorption capacity and sorbate concentration for $CO_2/N_2$ mixtures on carbonaceous sorbents. *Ind Eng. Chem. Res.* in review). These cycle times are subject to adjustment to account for specific material and application requirements and constraints. The total cycle time for this preliminary case is 6 min. The reason that the heating and cooling cycles can be so short is that both heating and cooling are accomplished directly, with a hot or cold gas flowing through and in a direct contact with the sorbent bed. By contrast, the indirect heating and cooling times would be much longer. Without any attempt to optimize the vessel size, a cylindrical module is selected (based on U.S. Army Corps of Engineers. *Adsorption Design Guide*; University Press of the Pacific: Honolulu, Hi., 2001; p B-7. (ISBN: 1-4102-1988-7.)), for example, 3.5 m in diameter and 2.0 m in length. For the sorption-desorption-cooling cycle previously described, this results in 300 alternating vessels, 100 of which are in a sorption mode, 100 are in a desorption mode, and 100 are in an air-cooling mode. This is just a preliminary example, with plenty of room for improvement by optimizing the vessel configuration by those skilled in the art.

Because the carbonaceous sorbents selected for this work are known to be stable (that is, their capacity does not change much over time), it is assumed that no sorbent replacement is required within a single depreciation cycle, which is 10 years. However, relaxing this assumption, for example, by replacing the sorbent more often, does not impact the cost of recovered $CO_2$ substantially. Among other design assumptions, the sorbent void fraction is estimated to be 0 and the blower efficiency is set to be 75%.

Among economic approximations, the interest rate is 15%, the corporate profits tax rate is 35%, the electricity cost is $0.07/kWh, the steam cost is $7/ton (or $3.2/MMBTU), and the annual maintenance and repair cost is 7% of the fixed capital investment (FCI). The manpower cost is a relatively minor component of the operating costs, and, hence, it is assumed to be approximately $2 million per year. This and the other first pass assumptions and approximations should be verified at the next evaluation stage of the most promising process routes.

The first-pass Carbon Filter evaluation results are presented below for a vacuum regeneration case, a steam regeneration case (or a hot-$CO_2$ regeneration case), all of which exclude heat integration with the power plant and $CO_2$ compression. The best case will subsequently be revised to account for power-plant integration savings and $CO_2$ compression costs.

Figure 13:
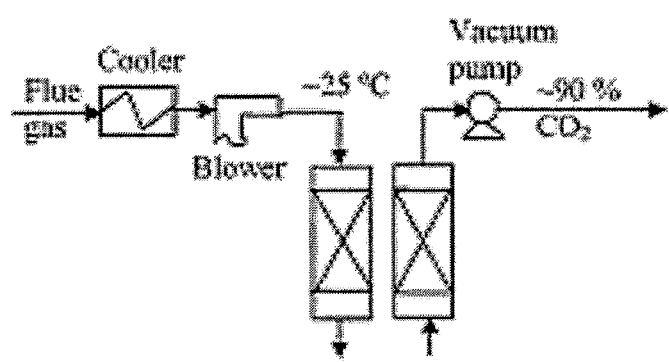
FIG. 13 is a schematic diagram of a pressure swing to vacuum process.

Vacuum Regeneration Comparable to the Benchmark. A simplified process diagram for Carbon Filter process with vacuum regeneration is shown in FIG. 13. Flue gas at approximately 85° C. is cooled to approximately 25° C. with water before it is fed with a blower to the sorption unit. After the sorbent is almost saturated with $CO_2$ for approximately 2 min, this unit switches to a 2 min regeneration cycle under vacuum, and then it alternates between the sorption and vacuum cycles at ambient temperature. The major cost items are associated with the vacuum pump. The total cost of the recovered $CO_2$ is approximately $37/ton, which is comparable to that of the amine benchmark case.

Thermal Regeneration with Steam or Hot $CO_2$ is Better than the Benchmark. An isobaric process with direct-steam or hot-$CO_2$ regeneration is shown in FIG. 5. Both sorption and desorption occur at ambient pressure. The feeding section and the sorption cycle are the same as those in the previous case. Instead of vacuum regeneration, however, the saturated sorbent bed switches to a steam heating cycle for 2 min, up to approximately 150° C., and then to a 2-min air-cooling cycle to bring the bed temperature to near ambient temperature. These estimates are based on the work of Geankoplis (Geankoplis, C. J. *Transport Processes and Unit Operation*, 3rd Edition; PTR Prentice Hall: Englewood Cliffs, N.J., 1993.) and Rousseau (Rousseau, R. W. *Handbook of Separation Process Technology*; Wiley: New York, 1987; p 654). The major cost items are steam and electricity, and the total cost of the recovered $CO_2$ is approximately $18/ton for AC1 and approximately $23/ton for Charcoal, which is much less than that for the amine benchmark.

Cost Summary. Table 5 illustrates the equipment and annual operating costs for three examples: AC1 with vacuum regeneration (AC1-Vac), AC1 with steam regeneration (AC1), and Charcoal with steam regeneration (Charcoal). The hot-$CO_2$ regeneration cost data are similar to the steam regeneration data presented in Table 5. In all these cases, the cost of recovered $CO_2$ is estimated at ambient pressure, prior to compression. Because coal sorbents have not been tested for exposure to high temperature and thermal stability, the Coal case is not included in Table 5.

TABLE 5

Low-Pressure $CO_2$ Cost Examples for Vacuum and Steam Regeneration

| | Cost (×10⁶ dollars) | | |
|---|---|---|---|
| | Vacuum | Steam Regeneration | |
| Sorbent | AC1 | AC1 | Charcoal |
| Vessel | 6.0 | 1.8 | 2.1 |
| Blower | 37 | 6.0 | 7.5 |
| Sorbent | 1.8 | 3.6 | 0.7 |
| Miscellaneous | 0.4 | 0.8 | 0.9 |
| Equipment total | 45.2 | 12.2 | 11.2 |
| Electricity | 32.5 | 10.7 | 13.5 |
| Steam | 0 | 22.0 | 34.9 |
| Maintenance | 19.1 | 4.4 | 4.0 |
| Miscellaneous | 0.7 | 0.8 | 0.8 |
| Annual cost | 52.3 | 37.9 | 53.2 |
| $/ton $CO_2$ | 37 | 18 | 23 |

Although a specific sorbent selection will likely be dependent on a more-detailed process optimization, including integration with the power plant, the AC1 sorbent is selected for further evaluation in this work, because it results in the lowest cost of recovered $CO_2$, as shown in Table 5 ($18/ton, approximately 60% lower than the benchmark cost).

If a specific sorbent prevents a target $CO_2$ purity from being obtained, two sorption stages may be needed.

Power Plant Integration Can Reduce $CO_2$ Costs. This example considers a generic power plant with at least three potential sources of thermal energy for the sorbent regeneration: (1) Effluent of the de-$NO_x$ reactor has a rate of approximately 488 m³/s (STP) and a temperature of approximately 330° C. (2) Bottom ash. Coal contains approximately 5% of ash, of which 80% goes upward as fly ash and 20% goes downward as bottom ash. The bottom ash temperature is approximately 1000° C. The Wyodak plant consumes approximately 6000 tons of coal per day, which translates to approximately 60 tons of bottom ash per day. (3) Low-pressure (LP) turbine steam at approximately 200° C. For example, assuming that a 500 MW power plant produces LP steam of approximately 100 000 kJ/s, 45 a 335 MW power plant such as the Wyodak facility will produce approximately 67,000 kJ/s of LP steam. When multiplied by a heat exchange efficiency (for example, 80%), this energy is equal to $mCp\cent T$, from which one can calculate the amount of sorbent (m) that can be heated with this steam, for example, for a $\cent T$ value of 125° C. (from 25° C. to 150° C.) and for a given heat capacity Cp (to a crude approximation, 1 kJ/(kg ° C.)).

Some of these heat sources may not be available if they are tied up in exchanging heat with combustion air. If at least some are available to provide the entire heat for the sorbent regeneration, which is the case in this work, the cost of recovered $CO_2$ is reduced by one-third, to $12/tons that is, about a quarter of the benchmark costs prior to any optimization attempt.

Compression and Potential Carbon Credits will Impact Electricity Costs. The low-pressure $CO_2$ cost previously estimated must be corrected for compression to make $CO_2$ ready for transport. The compression cost, from ambient to a pipeline pressure (e.g., 2000 psi) is estimated to add $6-8/ton CO2 ($7/ton in this work). Therefore, the total cost of compressed, pipeline-ready $CO_2$ for a power-plant integrated Charcoal case should be approximately $19/ton $CO_2$.

Adding a carbon capture unit to a power plant will affect the electricity cost and, hence, the profitability.

The electricity cost change is calculated by taking the product of $CO_2$ emission rate, recovery, purity, and the difference of capture cost less the credits which is then divided by the product of the power plant capacity, electricity selling price and a correlation factor of 8760. For the Wyodak example, the $CO_2$ emission rate is approximately 3.5 million tons per year, the $CO_2$ recovery is 90%, the $CO_2$ purity is 90%, the plant capacity is 335 MW, the number of operation hours per year is 8760, and the electricity selling price is assumed to be $0.07/kWh.

For a "green" electricity producer who captures $CO_2$, examples of are savings due to reduced severance taxes (if any), savings due to reduced or eliminated carbon taxes (if any), and income from selling $CO_2$, for example, to EOR and ECBMR operators. For example, if the power plant can reduce its coal severance tax from $6/ton to $4/ton of coal for reduced $CO_2$ emissions, it will save approximately $4/ton of captured and stored $CO_2$. A future carbon tax may augment these savings, for example, by approximately $30/ton (unknown at this time). The $CO_2$ price that EOR operators pay varies widely (e.g., from $4/ton to $40/ton). If a "green" power plant can sell $CO_2$ to an EOR buyer and gain, for example, $10/ton after the corporate profits tax and other adjustments, its hypothetical total credits will be as high as $44/ton (comprised of a $4 severance tax reduction, a $30 carbon tax reduction, and a $10 sales credit). For example, credits of $30/ton can effectively reduce the electricity cost by 10%, credits of $20/ton can leave the electricity cost unchanged, and zero credits can increase the electricity cost by approximately 30%; however, these estimates can vary substantially from case to case.

However likely or unlikely, if our Wyodak case achieves total credits of $30/ton of $CO_2$ and maintains the current electricity rates unchanged, its incremental after-tax profits will increase by approximately $105,000,000/yr. Assuming the same credits for all Wyoming plants in Table 2, if they somewhat unrealistically can capture and store or sell approximately $50 \times 10^6$ tons of $CO_2$ per year, a total incremental gain will be of the order of $1.5 billion/yr. One must stress that these are hypothetical examples that may not apply to real situations. However, they do illustrate the magnitude of economic opportunities if the carbon capture cost alone can be reduced substantially, relative to the conventional amine technology.

Conclusion. A low-pressure Carbon Filter Process proposed to capture carbon dioxide ($CO_2$) from flue gas is filled with a low-cost carbonaceous sorbent, such as activated carbon, charcoal, or coal, that has a high capacity to retain $CO_2$ but not nitrogen ($N_2$), which means a high $CO_2/N_2$ selectivity. The Carbon Filter process proposed in this work can recover at least 90% of the flue-gas $CO_2$ of 90% purity at a fraction of the cost normally associated with the conventional amine absorption process. The Carbon Filter can produce low-cost $CO_2$, because it requires neither expensive materials nor expensive flue gas compression, and it is easy to heat integrate with an existing power plant or a grassroots plant without affecting the cost of the produced electricity too much. An abundant supply of low-cost $CO_2$ is good news for enhanced oil recovery (EOR) and enhanced coal-bed methane recovery (ECBMR) operators, because it can lead to more oil and gas produced in an environmentally sensitive manner.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art that have the disclosure before them will be able to make modifications and variations therein without departing from the scope of the invention.

We claim:

1. A method for capturing carbon dioxide ($CO_2$) from a $CO_2$-containing flue gas mixture, comprising the steps of; (a) contacting the $CO_2$-containing flue gas mixture with a single-stage-sorption, fixed-bed having a carbon-rich sorbent and which retains between 50% and 95% of $CO_2$ from the flue gas mixture at temperatures near or below ambient temperature: and (b) liberating a $CO_2$-enriched effluent by heating the fixed bed to temperatures of about 100° C. to a few hundred ° C. or, alternatively, by reducing the pressure in the fixed bed.

2. A method as defined in claim 1, wherein the contacting step is carried out at or near ambient pressure.

3. A method as defined in claim 1, wherein the contacting step is carried out at elevated pressures.

4. A method as defined in claim 1 where the $CO_2$-containing flue gas mixture is selected from the group consisting of coal combustion gas mixture and other fossil-fuel combustion gas mixture.

5. A method as defined in claim 1 where the $CO_2$-containing flue gas mixture also comprises nitrogen oxides, sulfur oxides, mercury, mercury compounds, and arsenic compounds that are retained on the carbon-rich sorbent following the contacting step.

6. A method as defined in claim 1 where the sorbent particles are selected from the group consisting of coal coke, petroleum coke, charcoal, activated carbon, virgin coal, and chemically or physically modified versions of these materials.

7. A method as defined in claim 1, further comprising the step of storing the $CO_2$-enriched effluent in a oil-depleted reservoir.

8. A method as defined in claim 1, further comprising the step of storing the $CO_2$-enriched effluent in a methane-depleted reservoir.

9. A method as defined in claim 1, further comprising the step of releasing the sorbed $CO_2$ from the sorbent by vacuum combined with steam or other displacement agent.

10. A method as defined in claim 9, wherein the source of heat for heating the sorbent is provided, directly or indirectly, by steam or by hot $CO_2$ or by electromagnetic energy.

11. A method for capturing carbon dioxide ($CO_2$) from a $CO_2$-containing flue gas mixture, comprising the steps of:
    (a) contacting the $CO_2$-containing flue gas mixture with a single-stage-sorption, fixed-bed having a carbon-rich sorbent and which retains between 50% and 95% of $CO_2$ from the flue gas mixture at temperatures near or below ambient temperature;
    (b) liberating a $CO_2$-enriched effluent by heating the fixed bed to temperatures of about 100° C. to a few hundred ° C.;
    (c) capturing the liberated $CO_2$-enriched effluent;
    (d) cooling the fixed-bed to approximately ambient temperature; and
    (e) repeating steps (a)-(d).

12. A method as defined in claim 11, wherein said heating step comprises passing steam over the fixed bed.

13. A method as defined in claim 11, wherein said heating step comprises passing $CO_2$ heated to temperatures of about 100° C. to a few hundred ° C. over the single-stage, fixed bed.

* * * * *